Jan. 17, 1956     J. L. SHANNON     2,731,131
ARTICLE FEEDING
Filed Oct. 22, 1949     2 Sheets-Sheet 1
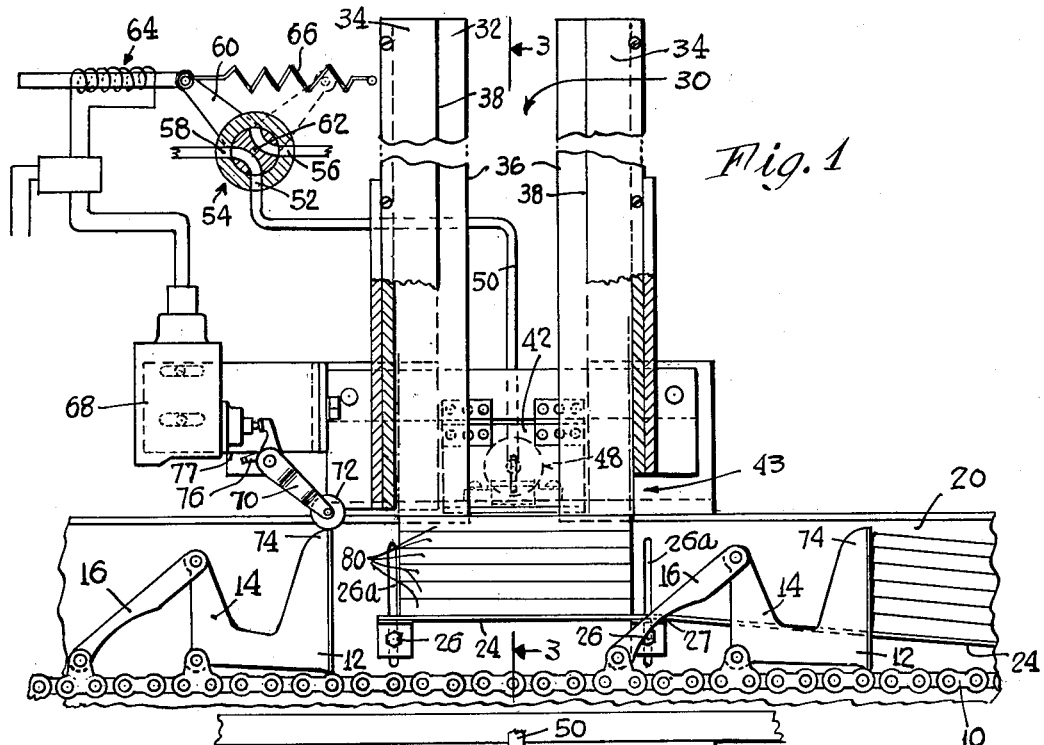
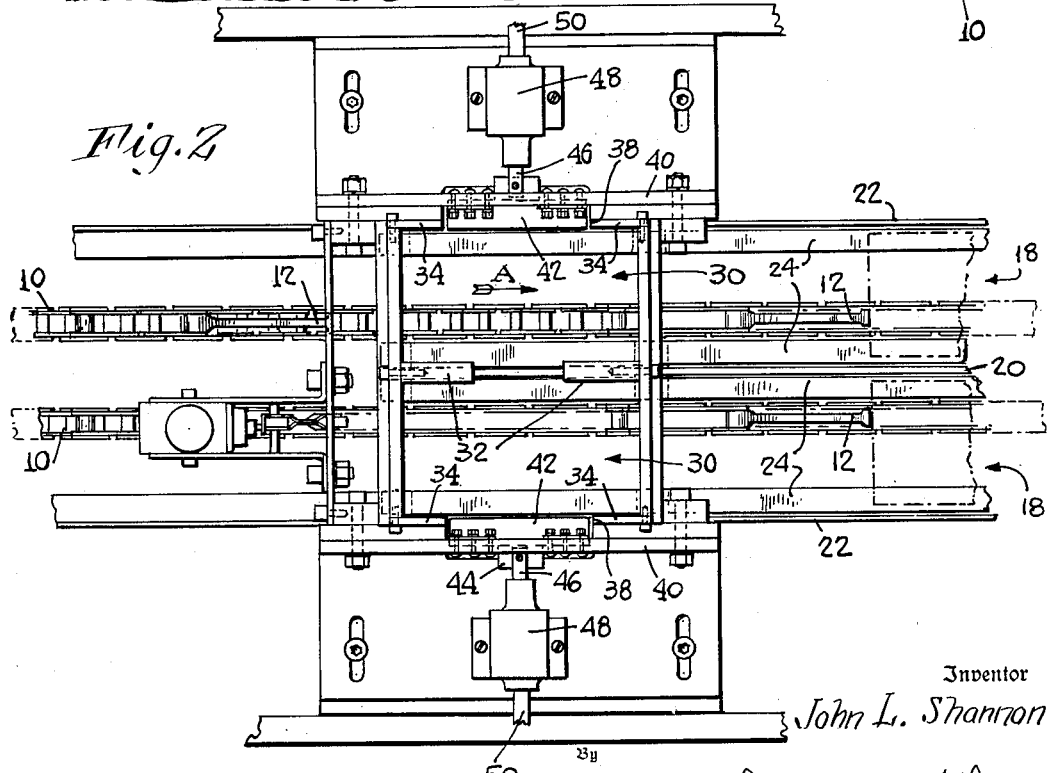
Inventor
John L. Shannon
Attorneys Jan. 17, 1956  J. L. SHANNON  2,731,131
ARTICLE FEEDING
Filed Oct. 22, 1949  2 Sheets-Sheet 2
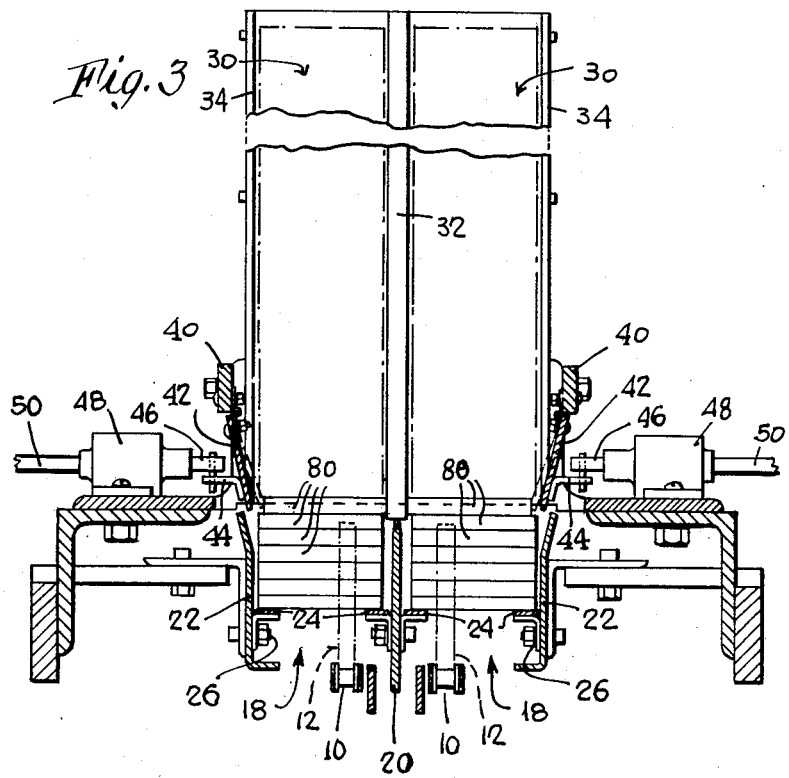
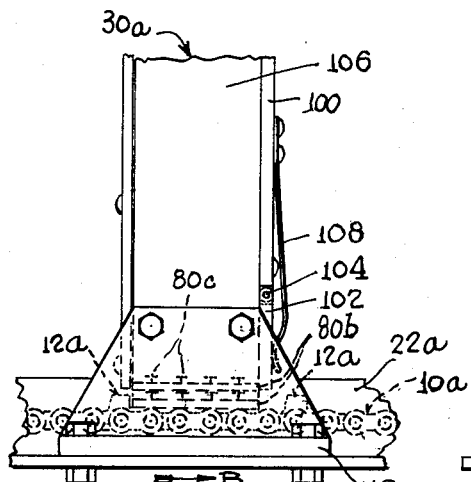
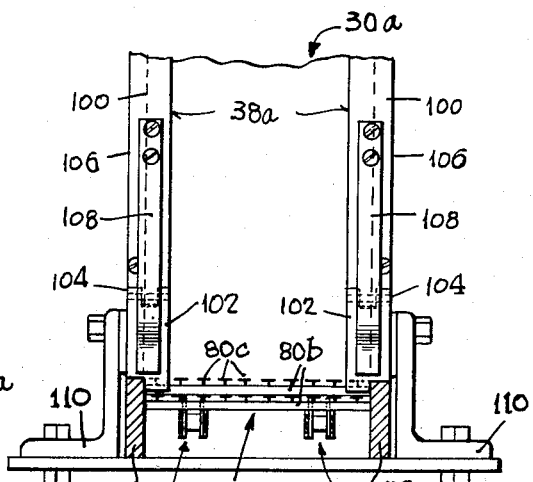
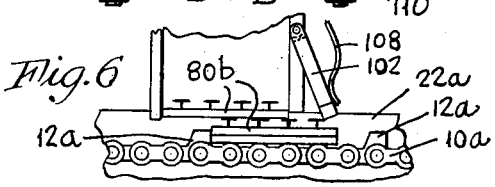
Inventor
John L. Shannon
By
Johnson and Kline
Attorneys United States Patent Office 2,731,131
Patented Jan. 17, 1956

2,731,131

ARTICLE FEEDING

John L. Shannon, Bridgeport, Conn., assignor to Waterbury Tack Company, Inc., Shelton, Conn., a corporation of Connecticut Application October 22, 1949, Serial No. 122,947

10 Claims. (Cl. 198—35)

This invention relates to article feeding methods and mechanism and more particularly to a magazine or stacking chute for receiving and holding a stacked supply of similarly shaped articles, in combination with an escapement and conveying means located at the chute discharge for cutting off from the stack a predetermined number of the articles and moving them away from the stack to a position where another operation, for example bundling or wrapping, may be performed thereon.

In the art of article feeding, and particularly with relation to wrapping and bundling machinery, it is customary to have an endless conveyor belt or chain provided with spaced positioning abutments for carrying the articles to be wrapped from a storage position outside the machine into the initial wrapping position in the machine. It is usually necessary with equipment now in use for the machine operator to place the articles manually on the conveyor and against the abutments as they pass his station, either one article at a time, or in small stacks each having a predetermined number of articles to be bundled together. This operation proves exceedingly tiresome for the operator for it demands a great deal of attention on his part. It is likewise subject to the possibility of errors in positioning or in number of articles which may result in frequent stoppage of the machine, seriously affecting its output.

It is an object of this invention, therefore, to provide a stacking chute and escapement means which can be manually fed by the operator at his leisure with random numbers of articles and without particularly close attention on his part, but which will assure a continuous supply of articles to the conveyor, said articles being delivered in accurate numbers when more than one at a time is required, or one at a time, and being accurately positioned on the conveyor whereby shutdowns in operation of the article treating machine, due to improper feeding, can be reduced to a minimum.

It is another object of the invention to provide an article stacking chute with a combined stack controlling means and overload safety device adjacent its discharge end designed to be overcome by an oversized outgoing object so as to allow the same to pass, thereby preventing jamming of the machine and consequent protracted delay. The operation of this overload safety device may also serve in some cases as an indicator to call the operator's attention to the presence of an improper article on the conveyor, thus permitting the condition to be rectified with at most only a minor delay in place of the major shutdown which is likely to result from a jam due to an oversized article in the treating machine.

A further object of the invention is the provision of a novel method for conducting the feeding of articles to an article treating machine wherein the articles are first stacked, then cut or picked laterally from the bottom of the stack, singly or in uniform groups, while the remainder of the stack is restrained in such a way that a predetermined force exerted by an oversize article and insufficient to injure the same, may surmount the force of the restraint and cause said oversize article to issue from the stack.

Other features and advantages will hereinafter appear.

In the drawings:

Figure 1 is a side elevation, partially broken away, and including a partial diagrammatic showing, of an article feeding means according to the invention.

Fig. 2 is a plan of the device shown in Fig. 1, less the diagram.

Fig. 3 is a section taken on line 3—3 of Fig. 1.

Fig. 4 is a side elevation of a modification of the invention.

Fig. 5 is a front elevation of the device shown in Fig. 4.

Fig. 6 is a fragmentary elevation similar to parts of Fig. 4, but showing the parts in different position.

The article feeding mechanism of this invention is used in connection with a machine for treating the article, for example a bundling or wrapping machine (not shown). Machines of this character ordinarily have an endless conveyor belt which takes articles from a storage position outside the machine into a position within the machine for performing the first operation thereon. Such a conveyor belt is illustrated in Figs. 1 and 2 as being an endless sprocket chain 10 provided with article positioning and moving abutments 12 at spaced intervals thereon. The abutments 12 may be mounted on the chain in any suitable manner, the integral L-shaped arms 14 and links 16 herein shown being merely that form of mounting suited to a particular bundling and wrapping machine in which continued horizontal movement of the abutment for a certain distance beyond the conveyor tail sprocket axis is required for proper operation at the first article treating station.

As shown in Fig. 2, two conveyor chains 10 may be conveniently placed side by side and operated simultaneously with their abutments 12 in transverse registry, whenever the operation of the subsequent treating machine admits of such an arrangement.

Each of the conveyor chains 10 runs in a guide trough or channel 18 formed by central wall 20, one of the side walls 22 and two bottom strips or tracks 24 which are positioned to engage the margins of articles moved by the conveyor and to slidingly support them against gravity during such movement. While the major portion (not shown) of the tracks 24 will preferably proceed at a level just above the upper surfaces of chains 10, the end portions are provided with mounting means, consisting of clamps 26 and slots 26a formed in walls 20 and 22, for connecting the tracks 24 to the walls for adjustment to higher or lower levels, the purpose for which will hereinafter appear. If required by the stiffness of material used in making the tracks 24, a flexible joint or hinge may be provided wherever necessary to permit such adjusting movement, for example at the location designated by numeral 27 in Fig. 1.

Mounted on the upper edges of plates 20 and 22 is a structure providing a pair of parallel magazines or stack guiding chutes 30, each being located over one of the guide channels 18 and having a plan conforming in shape and size with the articles to be handled and fed. As shown in the drawing, the chutes 30 have a common central wall 32 and side walls 34. Each of the walls 34 preferably has a vertical slot 38, while the central wall 32 has a narrower vertical slot 36. The slots 36 and 38 provide for easy placing of articles in the chutes 30 by the operator, and for good visibility of the supply condition in both chutes from either side of the machine.

Mounted across the outer bottom of each wall 34 is plate 40 to which is hinged a rigid depending flap or gripping jaw 42 for swinging movement into the adjacent guide chute 30 through the corresponding slot 38. An operating arm 44 mounted on the outer surface of each jaw 42 has driving connection with the ram 46 of a corresponding air cylinder 48, mounted on the machine frame and each of which is connected to an air supply conduit 50. The rams 46 are also preferably spring urged to an inward position in the cylinder, while air pressure applied thereto projects them out of their cylinders against such spring force.

The air conduits 50 are preferably interconnected and both lead to the operating port 52 of a three-way air valve 54, diagrammatically shown in Fig. 1, having a supply port 56, connected to any suitable air pressure supply, and an exhaust port 58 open to the atmosphere. The valve has an operating member 60 mechanically connected to a core 62 which is drawn towards the left in Fig. 1 by a solenoid 64 when the same is energized. The valve 54 is "normally on" as indicated by spring 66 which tends to hold the valve 54 in an "on" position 90° clockwise from that shown and with the operating member 60 in dotted line position, whereby the air pressure source is connected to the conduits 50 and hence to the cylinders 48.

Energization of the solenoid 64 to actuate valve 54 into the "off" position shown in Fig. 1, blanks off the air pressure source and connects the cylinders 48 with the atmosphere, thus permitting their springs to retract rams 46. This energization occurs in response to closing of a normally open switch 68 which is connected in series with the solenoid, and which is operated to close the circuit by a lever 70 having a roller 72 at the free end thereof for engagement with the tips 74 on the abutments 12. Stop means such as arm 76 is preferably provided to strike the surface 77 to limit the downward movement of lever 70 and thus prevent undesired engagement thereof with parts of the mechanism other than tips 74.

In the form of the invention shown, the proportions are designed for uniform intermittent movement of conveyor chains 10, i. e., the chains run in the direction of the arrow A, Fig. 2, continuously for a distance equal to the distance between abutments 12, halt for an instant, and then resume their forward movement for an equivalent distance, this cycle of operations being repeated indefinitely. This sequence is determined and effected by the article treating machine and is only of secondary interest in the combination of the present invention. Figs. 1 to 3 illustrate the position of parts at the instant when the chain motion ceases, the switch 68 having been so positioned on the machine frame that it is automatically operated to circuit-closing position by a tip 74 during the instant of non-movement of the chain. It will be readily appreciated, however, that by providing the abutments 12 with slightly greater spacing on the conveyor chain and possibly changing the shape of tips 74 is necessary, continuous operation of the conveyor at constant velocity could be had if suited to the requirements of the article treating machine served thereby.

In the operation of the form of the invention shown in Figs. 1 to 3, an operator manually feeds articles, shown in the drawings as flat packages 80, into the tops of magazines or stacking chutes 30. These articles may be fed in groups of any desired number at the convenience of the operator so long as the chutes are kept at least partially full. When the conveyor chains come to the position of Figs. 1 to 3, their movement is arrested by their intermittent drive from the treating machine and a tip 74 simultaneously deflects the lever 70 to a point where switch 68 is closed. This causes energizing of solenoid 64 and hence operation of valve 54 to "off" position. Rams 46 are consequently retracted by their springs withdrawing jaws 42 from contact with the articles in their chutes and allowing the stack to drop to the surface of tracks 24 as shown in Figs. 1 and 3. It is readily apparent that the level of tracks 24 below the tips 74 of abutments 12 determines the number of articles which will be cut off from the bottom of the stack when an abutment passes thereunder. As previously described this level is preferably adjustable by reason of the adjustable mounting means 26, 26a so that the machine may be set to accommodate an article of any desired thickness, or to take any desired number of articles up to the maximum permitted when the tracks are lowered to a level position. With the weight of the whole of each stack of articles 80 resting on the tracks 24, the chains 10 again take up their movement in response to their drive by the treating machine. A very slight initial movement of the abutment 12 permits the roller 72 to drop from the tip 74. This opens switch 68, deenergizes solenoid 64, allows spring 66 to move valve 54 to "on" position thus supplying air pressure to cylinders 48 and snapping jaws 42 into inward position as shown in broken lines in Fig. 3. This movement clamps at least one of the articles 80 in each chute 30 against the central wall 32. It will be noted that the bottom of jaws 42 are positioned at such a level that the lowermost article thus clamped is the one next above the highest one which the abutments 12 can reach when they pass under the stack. As shown in Fig. 3, the tracks 24 are set so that the abutments 12 can reach and cut from the bottom six articles of each stack, and hence the jaws 42 act on the sides of the seventh article from the bottom in each stack. The plates 40 and the pivots of jaws 42 are located outwardly enough so that the swinging movement of the jaws 42 at the time they engage the article, has a slight but distinct upward component. This tends to jar the stack of articles upwardly enough to permit clamping of the engaged article at a level a hair's breadth above that which it formerly occupied. In this way each of the articles which is engaged by a jaw 42 forms a floor under its respective stack to hold the weight and relieve the articles below it from the pressure of the stack.

A short interval elapses after the articles are clamped during which the next abutment 12 on each chain is progressing towards the respective stack. When it engages the stack, it cuts off that portion of the stack below the clamped article, including the bottom six articles for the adjustment shown in the drawings, and moves the same along the tracks 24 within the channels 18 towards the treating machine. At the same time the jaws 42 are firmly clamping the seventh article from the bottom in each stack and thus act as a retaining means to prevent its being carried along by friction with the articles therebelow which are being moved by the conveyor. The jaws 42 also grip the articles 80 and clamp them with sufficient force against the central wall 32, so that they will remain in this position and support the weight of the stack to prevent premature dropping of the same while the conveyor is moving. This sequence of operations, of course, recurs in the same way for each advancing set of abutments 12.

For the purposes of the description and the claims appended hereto, a "standard" article is regarded as one of the articles of uniform thickness with which the machine is designed to be used, or for which it has been intentionally adjusted. Hence, a "non-standard" article is one which is thicker or thinner than the articles making up the main bulk of the group and which was not in mind when the design or setting of the machine was determined. Such a non-standard article or object may also be referred to as "oversize" when larger and may exist by reason of the co-positioning and accidental or inadvertent connection between a plurality of standard articles, or even between a standard article and an undersize article, in a manner which will hereinafter appear.

While the grip of the jaws 42 on the article is rather firm, it is by its very nature readily releasable, for if an oversize non-standard article or other object should find its way into the chute, and if it were of such a height as to simultaneously engage both the tip 74 of an abutment 12 as well as the lower edge of one of the jaws 42, it could easily be slid from between said jaw and central wall 32 by endwise movement along the conveyor path in response to the force of a moving abutment 12 without damage to itself or to the conveyor.

This is due to the arrangement of substantial free space 43 at the lower front of each of the chutes 30 (Fig. 1) whereby they are open for their full width and for a substantial height. Thus reliance is placed on the jaws 42 for maintaining the clamped article in the stack, and the jaws are also enabled to act as an oversize relief in emergency. Since the air pressure supplied to the port 56 in valve 54 can be accurately controlled, the force necessary to release an article horizontally from the clamping action of the jaws 42 can be accurately determined, whereby the jaws exert a restraining force of predetermined maximum value on the article clamped, which force will be automatically surmounted when an excessive or potentially damaging force tends to be applied to the article by an abutment 12.

In Figs. 4 and 5 is shown a modified form of the invention designed more particularly for use in feeding a small number of relatively flat articles. As shown in the drawing, the articles 80a consist of boards 80b carrying an array of thumb tacks 80c, and the machine is arranged to cut off and feed forward one article 80a at a time from the bottom of the stack. In this form of the invention no attempt is made to grip the stack above the article being fed and hence the friction due to the weight of the stack is present during the cutting-off operation.

The conveyor belt is shown in the form of a pair of parallel, simultaneously operated sprocket chains 10a which operate between guide plates 22a mounted on the machine frame. Each of the chains carries a series of spaced abutments 12a, and the chains are arranged with their abutments directly opposite each other so as to act in unison. The height of the abutments is determined as the height necessary to reliably engage the bottom portion of the uppermost article 10a to be cut off from the bottom of the stack, here shown as the bottom article only. This height may of course be adjusted if desired, e. g. by bolting detachable increments to the top of said abutments 12a. Mounted on the machine frame and shown herein as resting on the upper edges of guide plates 22a is a hopper or guide chute 30a which may be manually filled by the operator at his leisure, at indefinite times, and with any desired number of articles. The chute 30a preferably has a slot 38a opening for its full height on the side from which the sprocket chain retreats in the direction of the arrow B. This makes the whole supply stack of articles visible at all times, and facilitates manual loading and unloading of the chute. The bottom or discharge opening of the chute, as can best be seen in Fig. 4, is arranged at a level such that it engages and acts as a stop for a standard article 80a next above the uppermost one in contact with the abutments 12a. This stopping is primarily accomplished by marginal strips 100 which form the portions of the front wall of the chute 30a at either side of the slot 38a. The lower end or relief portion 102 of each strip 100 is movable, is mounted by means of a hinge 104 so as to swing forwardly away from the chute, and is urged rearwardly towards the edges of side walls 106 by leaf springs 108 firmly mounted on the fixed portions of strips 100. The restraining force exerted by spring 108 may be adjustable if desired and is preferably rather large so as to easily overcome normal frictional sliding resistance between the surfaces of the articles, but still is insufficient to restrain movement against a force large enough to cause mechanical failure of one of the articles or of parts of the conveyor belt. The height of the lower or stop edge of the end portions 102 of strips 100 may of course be adjusted to correspond with the adjusted height of abutments 12a for accommodation of any desired number of standard articles of given thickness, for example by placing spacers under feet 110 which mount the chute 30a on the machine frame.

The form of the device shown in Figs. 4 and 5 is equally suitable for use with machines wherein the drive for the conveyor belt produces either continuous movement or uniform intermittent movement thereof.

In the operation of the device shown in Figs. 4 and 5 a supply of articles is manually fed into the chute 30a by the operator. The moving pockets in the conveyor chains 10a formed between the abutments 12a act as escapement means so that each time a pair of abutments 12a pass under the stack in the chute, the stack is allowed to drop down a distance equal to the height of one article 80a and place the next article 80a, now on the bottom of the stack, in position to be engaged and carried forward by the next pair of approaching abutments 12a on the conveyor chains 10a. In the normal operation of the machine this is all that occurs. However, since the weight of the article stack in the chute 30a is allowed to rest directly on the bottom article which is being separated, there is a certain amount of frictional resistance to its removal and the next-to-the-bottom article may in some cases tend to be dragged along with the bottom article if there are some surface irregularities at their opposed meeting faces. When this occurs the relief portions 102 will yield forwardly, exerting ever-increasing force on the upper of the two articles as the deflection of spring 108 increases. When a high value of restoring force in the spring is reached, or when the normal vibration of the equipment has released the temporary frictional engagement between the two bottom articles, or both, the springs 108 and relief portions 102 will restore the upper of the two articles to position in the stack, while the lower is drawn forward by the abutment 12a.

Certain conditions arise at times which tend to prevent proper operation of the equipment, for example, when an oversize article appears in the supply, or what amounts to substantially the same thing, an undersize article combines with a normal article to provide an oversize object which must be handled by the mechanism. The most frequent example of this in the device shown would be when one of the boards 80b finds its way into the supply chute 30a without any tacks 80c having been placed thereon. This together with the normal article 80a forms an object about one and one-half times the height of the article intended to be handled. If the projection of abutment 12a above the upper surface of the empty board is sufficient to catch the edge of the filled board above it, the two will be moved forward as one as shown in Fig. 6. Since the lower edges of relief portions 102 are much too low to pass an article of one and one-half times the normal height it will have to give way. Since the maximum force developed in the springs 108 is not sufficient to cause damage to the board 80b, to tacks 80c in the upper board, or to the conveyor mechanism, the predetermined maximum restraining force setting will be surmounted, the portions 102 will swing wide, remain so swung until the whole length of the oversize object passed, and then return to normal position with a substantial report. This type of operation of portions 102 serves as a detector for oversize articles which might impair the working of the article treating machine. It immediately calls the attention of the operator to the presence of a defective article on the conveyor in time to permit manual rectification of the error with little if any delay in the operation of the article treating machine.

Variations and modifications may be made within the scope of the claims and portions of the improvements may be used without others.

I claim:

1. An article feeding device comprising a receptacle for holding a vertical stack of articles with its bottom at a predetermined level; means periodically applying a shifting force to a portion of the stack having a predetermined height from the bottom of said stack and moving said portion laterally away from the stack in one direction, said receptacle being constructed to provide clearance space for simultaneous lateral passage of both the said stack portion and the next higher article in the said direction; impositive yielding means for simultaneously exerting a restraining force on said next higher article having a lateral component to normally prevent movement thereof with said shifting portion and having an upward component for supporting said next higher article so as to relieve the pressure of the stack from said portion moving laterally away from the bottom of the stack, said means being incapable to hold said next article if shifting force is applied thereto by said shifting means; means rendering said immediately preceding means inoperative to enable the remainder of said stack to drop so as to be bottomed again at said predetermined level after said portion has been moved out of the way; and means for continuously operating all of said previously recited means in sequence.

2. An article feeding device comprising a conveyor having a flight moving in one direction; spaced abutments included as a part of said conveyor and moving therewith for engaging and advancing articles in said direction; a receptacle for holding a plurality of articles in stacked relation and for presenting one end of the stack to said conveyor, said stack being continuously urged towards said conveyor with said one end urged toward the path swept by said abutments; stop means supporting the lowermost portion of the stack within the sweep of said abutments during said movement; and restraining means positioned to support and to act on that article in a stack of standard articles next above the said lowermost portion, for preventing movement of said next article along said path and for relieving the lowermost portion from the pressure exerted by the stack while the end of the stack is traversed by an abutment, said receptacle being constructed to provide clearance space for simultaneous lateral passage of both the said stack portion and the next higher article in the said direction and said restraining means being impositive whereby it will be overcome and allow passage of said stack portion and next higher article away from the stack if an article of other than normal thickness is inadvertently present in said lowermost portion of the stack and causes one of the articles of the stack to be simultaneously engaged by both an abutment and said restraining means.

3. An article feeding device comprising a uniformly moving belt conveyor having a flight moving in one direction; spaced abutments included as a part of said conveyor, extending upwardly from said flight, and moving therewith for engaging and advancing articles in said direction; an upright receptacle mounted above said flight for holding a plurality of articles in stacked relation and for presenting the lower end of the stack of articles to said conveyor whereby gravitational force continuously urges the stack towards said conveyor with said lower end extending into the path swept by said abutments; stop means associated with the conveyor supporting the lowermost portion of the stack within the sweep of said abutments during said movement; and restraining means positioned to support and to act on that article in a stack of standard articles next above the said lowermost portion, for preventing movement of said next article along said path and for relieving the lowermost portion from the pressure exerted by the stack while the end of the stack is traversed by the abutment, said receptacle being constructed to provide clearance space for simultaneous lateral passage of both the said stack portion and the next higher article in the said direction and said restraining means being impositive, whereby an overthick object inadvertently present in said stack and capable of simultaneously engaging both an abutment and said restraining means will be permitted to overcome said restraining means and proceed to said direction along said path.

4. An article feeding device comprising a uniformly moving belt conveyor having a flight moving in one direction; spaced abutments included as a part of said conveyor and moving therewith for engaging and advancing articles in said direction; means for holding a plurality of articles in stacked relation and for presenting one end of the stack of articles to said conveyor, and arranged for continuously urging said stack towards said conveyor with said one end urged toward the path swept by said abutments; stop means associated with the conveyor, supporting the said one end of the stack within the sweep of said abutments during said movement; a normally retracted jaw hingedly mounted on the device and positioned when actuated to engage that article in the stack next beyond the last one coming within the sweep of said abutments and to swing generally perpendicular to said direction so as to frictionally engage an edge of the article on a side parallel to said direction with a force having an upward component; and actuating means controlled by operation of the conveyor for urging said jaw towards said last-mentioned article to clamp and support the same between itself and a portion of said article holding means so that the portion of the stack supported by said stop means within the sweep of said abutments is relieved of the pressure exerted by the articles above it.

5. An article feeding device comprising a uniformly moving belt conveyor having a flight moving in one direction; spaced abutments included as a part of said conveyor and moving therewith for engaging and advancing articles in said direction; means for holding a plurality of articles in stacked relation and for presenting one end of the stack of articles to said conveyor, and arranged for continuously urging said stack towards said conveyor with said one end urged toward the path swept by said abutments; stop means associated with the conveyor, supporting the said one end of the stack within the sweep of said abutments during said movement; a jaw hingedly mounted on the device and positioned to engage that article in the stack next beyond the last one coming within the sweep of said abutments and to swing generally perpendicular to said direction so as to frictionally engage an edge of the article on only one side parallel to said direction; and means for urging said jaw towards said last-mentioned article to clamp and support the same between itself and a portion of said article holding means, the hinged mounting for said jaw being spaced outwardly away from the adjacent surface of said stack and located at the side of said jaw remote from said conveyor, whereby the movement of the jaw into engagement with said last mentioned article has a significant component in the direction away from said conveyor so that the portion of the stack supported by said stop means within the sweep of said abutments is relieved of the pressure exerted by the articles above it.

6. An article feeding device comprising a uniformly moving belt conveyor having a flight moving in one direction; spaced abutments included as a part of said conveyor and moving therewith for engaging and advancing articles in said direction; means for holding a plurality of articles in stacked relation and for presenting one end of the stack of articles to said conveyor, and arranged for continuously urging said stack towards said conveyor with said one end urged toward the path swept by said abutments; stop means associated with the conveyor, supporting the said one end of the stack within the sweep of said abutments during said movement; a jaw hingedly mounted on the device and positioned to engage that article in the stack next beyond the last one coming within the sweep of said abutments and to swing generally perpendicular to said direction so as to frictionally engage an edge of the article only on one side parallel to said direction; and an air-operated ram connected to said jaw for urging said jaw towards said last-mentioned article to clamp and support the same between itself and a portion of said article holding means so that the portion of the stack supported by said stop means within the sweep of said abutments is relieved of the pressure exerted by the articles above it.

7. An article feeding device adapted to feed articles singularly or in stacks comprising a uniformly moving belt conveyor having a flight moving in one direction; spaced abutments included as a part of said conveyor and moving therewith for engaging and advancing articles in said direction; means for holding a plurality of articles in stacked relation and for presenting one end of the stack of articles to said conveyor, and arranged for continuously urging said stack towards said conveyor with said one end urged toward the path swept by said abutments; stop means associated with the conveyor, supporting the said one end of the stack, said stop means being adjustable to vary the number of articles stacked within the sweep of said abutments during said movement; a jaw hingedly mounted on the device and positioned to engage that article in the stack next beyond the last one coming within the sweep of said abutments and to swing generally perpendicular to said direction so as to frictionally engage an edge of said article only on one side parallel to said direction; an air-operated ram connected to said jaw for urging said jaw towards said last-mentioned article to clamp and support the same between itself and a portion of said article holding means so that the portion of the stack supported by said stop means within the sweep of said abutments is relieved of the pressure exerted by the articles above it; and means including a feeler located adjacent said path and actuated by passage of one of said abutments for depriving said ram of air pressure and permitting said stack to move towards said conveyor.

8. An article feeding device comprising a uniformly moving belt conveyor having a flight moving in one direction; spaced abutments included as a part of said conveyor extending upwardly from said flight, and moving therewith for engaging and advancing articles in said direction; an upright magazine mounted above said flight for holding a plurality of articles in stacked relation and for presenting the lower end of the stack of articles to said conveyor whereby gravitational force continuously urges a stack in said magazine towards said conveyor with said lower end urged toward the path swept by said abutments; stop means associated with the conveyor, supporting the said one end of the stack within the sweep of said abutments during said movement; a jaw hingedly mounted on the device and positioned to engage that article in the stack next above the last one falling within the sweep of said abutments and to swing generally perpendicular to said direction so as to engage the last-mentioned article on a side parallel to said direction; and yieldable means for urging said jaw towards said last-mentioned article to impositively clamp and support the same between itself and a portion of said magazine, thereby to enable the article to be carried off by the conveyor if it is inadvertently positioned lower than normally intended.

9. A method of feeding articles, either singly or in stacks, comprising the steps of forming vertical stacks of articles bottomed at a predetermined level, periodically removing the lower portion consisting of a predetermined number of articles laterally from the bottom of said stack, lifting slightly the upper portion of the stack and simultaneously yieldably supporting the next article immediately above the uppermost article of said lower portion so that the latter is freely moved laterally away from said stack, and releasing said upper portion of said stack after said articles are removed so that the remainder thereof are bottomed again at said predetermined level.

10. A method of feeding articles, either singly or in stacks, comprising the steps of forming vertical stacks of articles bottomed at a predetermined level, periodically removing the lower portion consisting of a predetermined number of articles laterally from the bottom of said stack, lifting slightly the upper portion of the stack and simultaneously yieldably supporting the next article immediately above the uppermost article of said lower portion so that the latter is freely moved laterally away from said stack, and whereby the said next article may be removed with the said predetermined number of articles whenever the height of said lower portion is less than a predetermined normal height, and releasing said upper portion of said stack after said articles are removed so that the remainder thereof are bottomed again at said predetermined level.

References Cited in the file of this patent

UNITED STATES PATENTS

| | | |
|---|---|---|
| 982,092 | Robinson | Jan. 17, 1911 |
| 1,175,855 | Williamson | Mar. 14, 1916 |
| 1,320,504 | Spaulding | Nov. 4, 1919 |
| 1,330,639 | Leumann | Feb. 10, 1920 |
| 1,493,480 | De Tour | May 14, 1924 |
| 1,676,639 | Elliot | July 10, 1928 |
| 1,886,378 | Dearsley | Nov. 8, 1932 |
| 2,345,937 | Joa | Apr. 4, 1944 |
| 2,553,683 | Smith | May 22, 1951 |

FOREIGN PATENTS

| | | |
|---|---|---|
| 18,132 of 1904 | Great Britain | June 23, 1905 |
| 442,961 | Germany | Apr. 11, 1927 |